(12) United States Patent
Wallman

(10) Patent No.: US 7,640,182 B2
(45) Date of Patent: Dec. 29, 2009

(54) METHOD AND APPARATUS FOR CORPORATE VOTING

(75) Inventor: Steven M. H. Wallman, Great Falls, VA (US)

(73) Assignee: FOLIOfn, Inc., Vienna, VA (US)

( * ) Notice: Subject to any disclaimer, the term of this patent is extended or adjusted under 35 U.S.C. 154(b) by 327 days.

(21) Appl. No.: 11/218,589

(22) Filed: Sep. 6, 2005

(65) Prior Publication Data

US 2005/0288996 A1 Dec. 29, 2005

Related U.S. Application Data

(63) Continuation of application No. 09/537,800, filed on Mar. 29, 2000, now abandoned.

(51) Int. Cl.
*G06F 11/00* (2006.01)

(52) U.S. Cl. ...................................................... 705/12
(58) Field of Classification Search ................ 705/12
See application file for complete search history.

(56) References Cited

U.S. PATENT DOCUMENTS 5,400,248 A * 3/1995 Chisholm .................... 705/12
6,240,415 B1 * 5/2001 Blumberg ...................... 707/9
2003/0233274 A1 * 12/2003 Urken et al. ................. 705/12

OTHER PUBLICATIONS

Chisholm, John. "Conditional Voting." UNIX Review, vol. 13, No. 9, pp. 11-16, Aug. 1995.*
Layne, Barry. "Murphy Called For Second Tour of Duty at CapCities." Hollywood Reporter, p. 1, Oct. 19, 1993.*
"Special Meeting of Shareholders Re-scheduled." PR Newswire, p. 308LAF024, Mar. 8, 1996.*
"Avatex Corporation Announces Agreement on Amended Merger Transaction and Settlement of Preferred Stockholder Litigation." PR Newswire, Jun. 18, 1999.*

* cited by examiner

*Primary Examiner*—Susanna M Diaz
(74) *Attorney, Agent, or Firm*—Kenyon & Kenyon LLP

(57) ABSTRACT

A proxy voting system enables an investor with a large number of investments to efficiently manage and vote proxies. A shareholder enters preferences regarding how to vote his or her proxies into a computer system, which then screens the received proxies, automatically enters the shareholder's preferences onto the proxy card and returns the completed proxy card to the appropriate election authority at the proper time. The system includes a central controller, a user interface for each investor, a proxy server and a manual entry subsystem, which provides an interface for those corporations that are not equipped to handle electronic formatted proxies.

3 Claims, 12 Drawing Sheets folioTrade Administrator - Edit Notification

General | Questions | Documents

ID and Description
- Cusip: 51
- Description: 52

Important Dates
- Cutoff Date: 53
- Notified Date: 54
- Email Notification Date: 55
- Issuer Notification Date: 56
- Effective Date: 57
- Expiration Date: 58

Notification Type
- Notification Type: 59
- Is Proxy: ☐ 60

Results
- Username: 61
- Password: 62

[ Save Notification ] [ Cancel ]

FIG. 3C

| | 48 | | |
|---|---|---|---|
| ⊕ folioTrade Administrator - Edit Notification | | | ☒ |

47 — General | Questions | Documents — 49

| Document Name | File Type | Description | Location |
|---|---|---|---|
| Annual Report | 📄 PDF | Lies and Fairies | database |
| Presidents Face | 📝 MS WORD | Bald, Glasses | database |

— 46

| Add Document | Delete Document |
|---|---|

| Save Notification | Cancel |
|---|---|

METHOD AND APPARATUS FOR CORPORATE VOTING

RELATED APPLICATIONS

The present invention is a continuation of U.S. patent application Ser. No. 09/537,800, filed on Mar. 29, 2000 now abandoned, and is related to U.S. patent application Ser. No. 09/038,158 and to U.S. patent application Ser. No. 09/139,020, which is a continuation-in-part of U.S. patent application Ser. No. 09/038,158. U.S. patent application Nos. 09/038,158 and 09/139,020 disclose a portfolio manager for creating and managing portfolios of securities, in which, among other things, trades are aggregated and/or netted prior to execution.

BACKGROUND OF THE INVENTION

The present invention relates generally to methods and apparatuses for voting shares of corporations held by investors, and more particularly to a method and apparatus for voting shares held by an investor in a [large] publicly traded corporation.

Traditionally, an issuer of shares (e.g., a publicly-held corporation) sends a copy of the corporate action notification or the proxy statement to each individual shareholder via regular mail. When the shareholders receive it, they analyze the corporate action notification or proxy statement, and depending on the type of notification, the shareholders may mark their votes on the action notification document or the proxy card and return the papers to the issuer via regular mail. For proxies, the shareholders can alternatively indicate their preferences by attending the shareholders' meeting, during which the votes are formally cast. At the end of a voting period, the corporate election official manually goes through all the returned corporate action notifications and proxy voting cards and counts the votes for each issue. These votes are added to the votes that were cast by individuals attending the shareholders' meeting. This manual process is very labor intensive, slow, complicated and prone to error, as well as costly to the issuer.

To attempt to remedy these problems, some corporations, such as Microsoft Corporation, send their proxies by electronic mail to their shareholders, thereby allowing shareholders to return their proxy by simply replying to the email. While simplifying the process somewhat for the corporation, this electronic mail-based process still requires shareholder attention to every received proxy statement and corporate action notification.

The current system of mailing proxies to elicit shareholder votes was devised in an era when investors typically held relatively small numbers of different securities. For example, investors typically owned a handful of stocks. As the number of publicly traded companies has increased significantly along with a concomitant awareness of modern portfolio theory (i.e., the idea that diversification of one's investments will result in statistically better and predictable overall returns), the numbers of different securities held by an individual has been increasing to the point where managing one's proxies can become difficult, if not cumbersome. According to the theory, investors should hold as many as twenty or thirty different securities to be sufficiently diversified against risk. Moreover, if the number of Initial Public Offerings continues at the recent pace, the number of different securities available to individual investors may become truly large.

In apparent recognition of the difficulty in managing one's proxies, a system for managing proxies was developed, ProxyEdge 2000, which is available from ADP (Automatic Data Processing, Inc.) of Roseland, N.J. ProxyEdge 2000 is a Windows®-based software package that allows one to electronically vote and maintain records on publicly traded securities for accounts custodied at banks and brokers. While simplifying the record-keeping aspects to some degree, this system still requires users to review proxy statements and determine how to vote their shares.

Given the extremely small percentage voice an individual shareholder owns in a publicly traded stock, the amount of effort required to manage and vote one's proxies is significantly disproportionate with such an extremely small voice, hence many investors currently ignore proxies.

In addition, many small investors do not vote their proxies because they do not understand the issues discussed in the proxy statements (or are unwilling to invest the time to understand the issues), they do not know any of the individuals running for the board of directors, nor do they believe their votes will have any impact on the result. The end result is that management of large publicly traded companies can become entrenched, ossified and unresponsive to the concerns of shareholders, despite what at least superficially appears to be a relatively representative process.

The present invention is therefore directed to the problem of developing a method and apparatus for enabling a shareholder to manage and vote shares in a simple and efficient manner, which is particularly suitable for voting and managing large numbers of proxies.

SUMMARY OF THE INVENTION

The present invention solves this problem by enabling a shareholder to enter preferences regarding how to vote his or her proxies into a computer system, which then screens the received proxies and automatically enters the shareholder's preferences onto the proxy card. The completed proxy cards are then automatically returned to the election authority at the proper time.

In addition, the present invention provides a user interface by which a manager or administrator of a particular group desirous of encouraging voting in a particular manner (termed herein as an "affinity group"), can enter voting recommendations on corporate actions for corporations in the system. Many different affinity groups (i.e., third parties with specified agendas, such as environmental groups, political associations, investor associations, stock analysts, or other groups or trade associations) can be represented, thereby allowing the user to determine how to vote based on the affinity groups' known support or opposition to particular corporate actions.

The present invention also permits users to vote in opposition to or support of voting recommendations of particular affinity groups.

Thus, in combination the elements of the present invention create a powerful method and apparatus for enabling shareholders to vote in an informed manner and yet do so in an efficient and simple manner.

BRIEF DESCRIPTION OF THE DRAWINGS

FIGS. 3A-L depict various exemplary web pages in a graphical user interface according to one aspect of the present invention.

DETAILED DESCRIPTION

Overview

Figure 1:
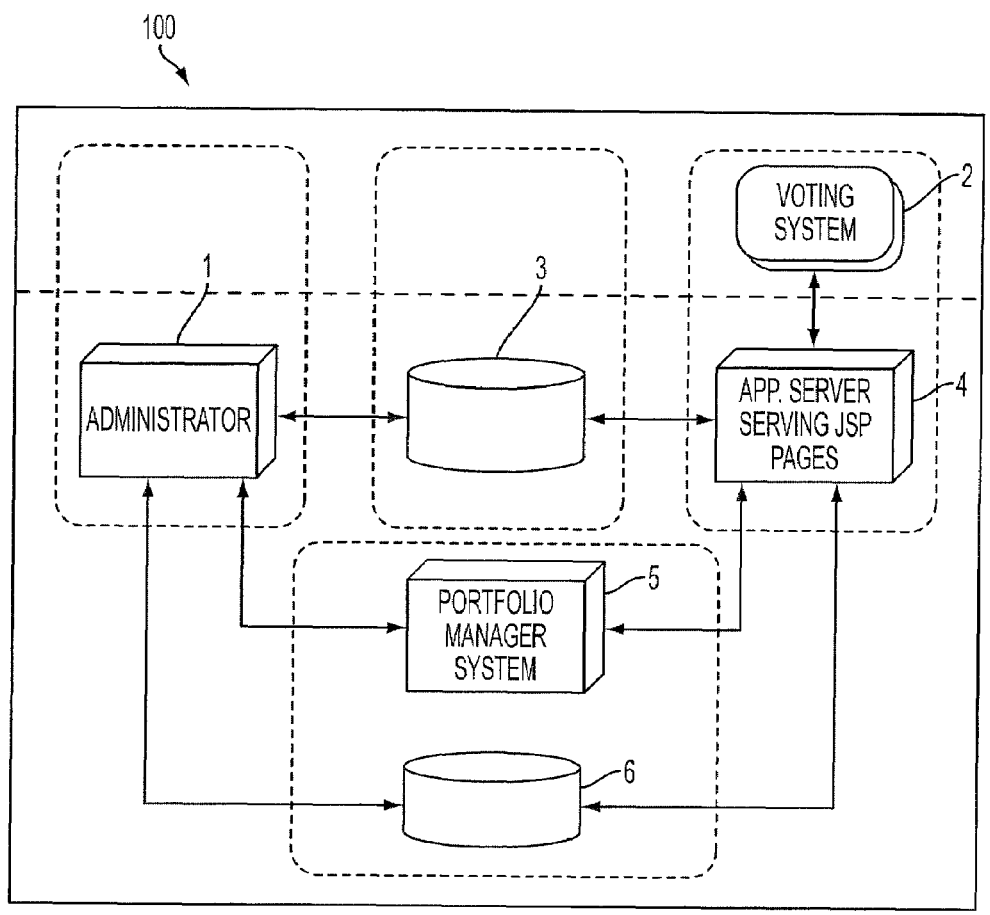
FIG. 1 depicts an exemplary embodiment of a system according to the present invention.

The present invention provides an Internet-based corporate action notification and proxy voting system to alert investors of any corporate action notifications issued by companies in which they own stock (or other assets/liabilities) and to solicit and track shareholder votes on various corporate issues. The present invention provides the capability to manage corporate voting, as well as to simplify corporate voting by enabling shareholders to vote their shares in accordance with third party recommendations.

According to one exemplary embodiment of the present invention, the system includes a graphical user interface (referred to herein as the organizational interface) by which various organizations (including management of the same or even different corporation, and possibly competing corporations) can provide recommendations to voting shareholders. The organizational interface enables special interest or other organizations to provide recommendations as to how to vote in upcoming corporate elections or other corporate votes.

One exemplary embodiment of the organizational interface includes a dedicated web site on the Internet or other public computer forum to which officers or other duly authorized agents of a given organization may download voting recommendations for particular corporations. If a particular organization desires to publish its recommendations for certain corporate actions, it requests a form on the web site, which allows the organization to submit voting recommendations in accordance with the web site's format. Once the completed recommendations are received, they are stored in a database, whose contents are displayed on the web site. Registered users can then determine which organizations, if any, have published share voting recommendations for particular companies. For example, on the web site a user can specify a corporation in which the user is interested to determine whether any affinity groups have registered share voting recommendations for that corporation.

One possible way of specifying the corporation is to enter the stock symbol (or other identifier or name) of the publicly traded company into a search engine. The result from the search would be a list depicting organizations or affinity groups that have entered voting recommendations for the specified company.

The user can then choose to create a link between one of the listed organizations and the user's preferences as to how the user intends to vote. Alternatively, the user can specify multiple organizations in which the user is interested regarding voting recommendations. The final vote for the user could then depend on a majority decision or even a weighted majority decision. For example, the user could specify five different organizations, and the voting recommendations could be based on three or more of the five organizations that agree on a particular issue.

Alternatively, the user could give more weight to a specific organization without delegating the decision completely to any one organization by applying weights to each selected organization. For example, the user could specify five organizations, but give a 26% weight each to two organizations and a 16% weight each to three other organizations, which would provide a majority if the two higher weighted organizations agree and require at least one of the higher weighted organizations to always be in the majority. In this exemplary embodiment, any weight to any affinity group can be established by the user.

Once the link is established, the user's shares are then voted in accordance with the recommendations of the organization to which the user has established the link without further action on the part of the user. Thus, with a single click of a mouse, the user can establish voting patterns for all of the user's shares in a given company. Moreover, the user can use the same voting recommendations for all of its holdings, such as always following the recommendations of a particular organization for all corporations in which the user owns shares.

The exemplary embodiment of the system of the present invention includes a graphical user interface that enables shareholders to establish preferences by which they will vote on future corporate actions, which greatly simplifies shareholder voting. An exemplary embodiment of the graphical user interface includes a web site (intranet or Internet based) that provides a list of affinity groups with voting recommendations from which a user may select as input for future voting.

Another exemplary embodiment of the system of the present invention includes a user interface via which information is rendered. Information can include, for example, names and/or stock symbols of corporations, descriptions of corporate actions, lists of affinity groups, positions of affinity groups, recommendations of affinity groups, and/or voting preferences of shareholders. Information is "rendered" by making it comprehensible to the recipient. For example, information in textual or graphic form can be rendered to a human recipient when it is displayed on a screen visible to the recipient, or printed on a piece of paper at a printer, etc. Audio information can be rendered when it is played through a speaker, or a telephone unit, etc. Audiovideo information can be rendered when it is shown on a television, displayed on a computer screen, etc. An example of a player for e-mail information is the Outlook e-mail program manufactured by the Microsoft Corporation of Redmond, Wash. An example of a player for information on a World Wide Web page is the Netscape Navigator, manufactured by Netscape Communications of Mountain View, Calif.

By enabling a shareholder to select a "trusted" third party to investigate the issues involved and to recommend how to vote, the present invention enables recommending organizations to leverage their research regarding how to vote into potentially millions of normally unvoted shares, or shares that often simply vote with management. This creates the necessary incentive for heretofore silent organizations to investigate and provide voting recommendations for interested shareholders. Given the relatively small ownership percentage each of these shareholders usually owns, few shareholders can justify the expense in time to research and fully understand the issues included in many proxy statements. The present invention creates both the incentive for such research and the simplicity of voting that will result in, for the first time, informed corporate voting. Consequently, management of publicly traded corporations will have to deal with the recommending organizations and respond to their issues, which to date few organizations do.

The present invention enables users to specify their preferences once and then continue to vote in corporate actions with little or no input. The resulting simplicity enables shareholders to properly manage and own shares in a relatively vast number of different corporations.

As used herein, a "corporate action notification" is a document (in either hard or soft copy format, e.g., electronic format) used to provide shareholders with specific corporate information. This document may contain questions on which the shareholder needs to vote or specify their preferences.

As used herein, a "proxy" is a document providing shareholders with information necessary to vote in an informed manner on various issues affecting a corporation. This document includes information on closely held shares. Shareholders can and often do give management their proxy, representing the right and responsibility to vote their shares as recommended in the proxy statement.

EXEMPLARY EMBODIMENT

One exemplary embodiment of the present invention includes an electronic proxy voting system to which is coupled a graphical user interface via which shareholders enter voting preferences and affinity groups enter voting recommendations. Once the voting recommendations and voting preferences are entered, the system automatically completes the proxies in accordance with the entered voting preferences and voting recommendations.

As an exemplary illustration of the term "automatically", a proxy can be automatically completed when it is completed without substantial human involvement. For example, in one embodiment, a proxy can be completed fully-automatically, wherein there is no human involvement. In another exemplary embodiment, a proxy can be completed quasi-automatically, wherein the only human involvement is that needed to initiate a process by which the proxy is completed. In yet another exemplary embodiment, a proxy can be completed semi-automatically, wherein a list of voting recommendations and preferences, along with the proxy, are communicated to a human and the human selects the vote responses on the proxy that best meet the recommendations and/or preferences by, for example, selecting the response and clicking a "Select" button on a computer screen.

In this exemplary embodiment, the issuer (typically the corporation) first notifies the electronic proxy voting system of a new action notification or proxy in a hardcopy or electronic format. The electronic proxy system then transforms all data not currently in electronic format to electronic format, which can be accessed over the Internet. The system then notifies all eligible shareowners of the new notification and its location on the Internet. Upon receiving such notification, shareholders can go to the specified Internet site to read the action notification document or proxy statement and cast their votes. The system tracks all the votes in a database, and at the end of the voting period reports the results to the issuer.

The above exemplary embodiment includes several major components. FIG. 1 depicts an exemplary architecture 100 of this embodiment. An administrator 1 sets up the notification information, reports results and prints billing reports. A voting system 2 lets the shareholders and affinity groups enter and edit votes. A proxy voting system database 3 holds the notification information including the questions and votes. A portfolio management system 5 and its database 6 are coupled to the administrator and application server 4.

Administrator

One exemplary embodiment of the administrator 1 contains the graphical user interface for entering corporate action notification documents, information, questions and possible answers into the system. A user of the Administrator is a trained user who gathers the notification information from the documents sent by the issuer and enters that information into the system 10. The Administrator User Interface takes the information and saves it in database tables, which are stored in a standard database, such as an Oracle® database.

One exemplary embodiment of the Administrator 1 is a java program that resides in the central controller within the portfolio management system 5 and which accesses the infrastructure enterprise java beans (EJBs) directly. EJBs are reusable server side business components that can be used from other java or non-java programs. EJBs encapsulate the business logic and complexity of the data structures. The Administrator GUI contains a wizard-like user interface that lets the user enter data step by step.

Exemplary web pages are depicted in FIGS. 3A-K. The administrator main screen contains access to all of the system features. The screen is arranged in tabs. Each tab provides a subset of functionality, e.g., notifications, shareholder and affinity groups.

Figure 3A:
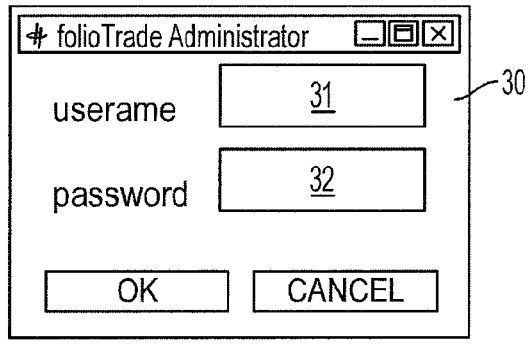

FIG. 3A depicts the user login screen 30 that enables the system to perform authentication of a given user by verifying a username entered in the username field 31 and a password entered in the password field 32. Potential users include shareholders, affinity group officers, as well as system administrators.

Figure 3B:
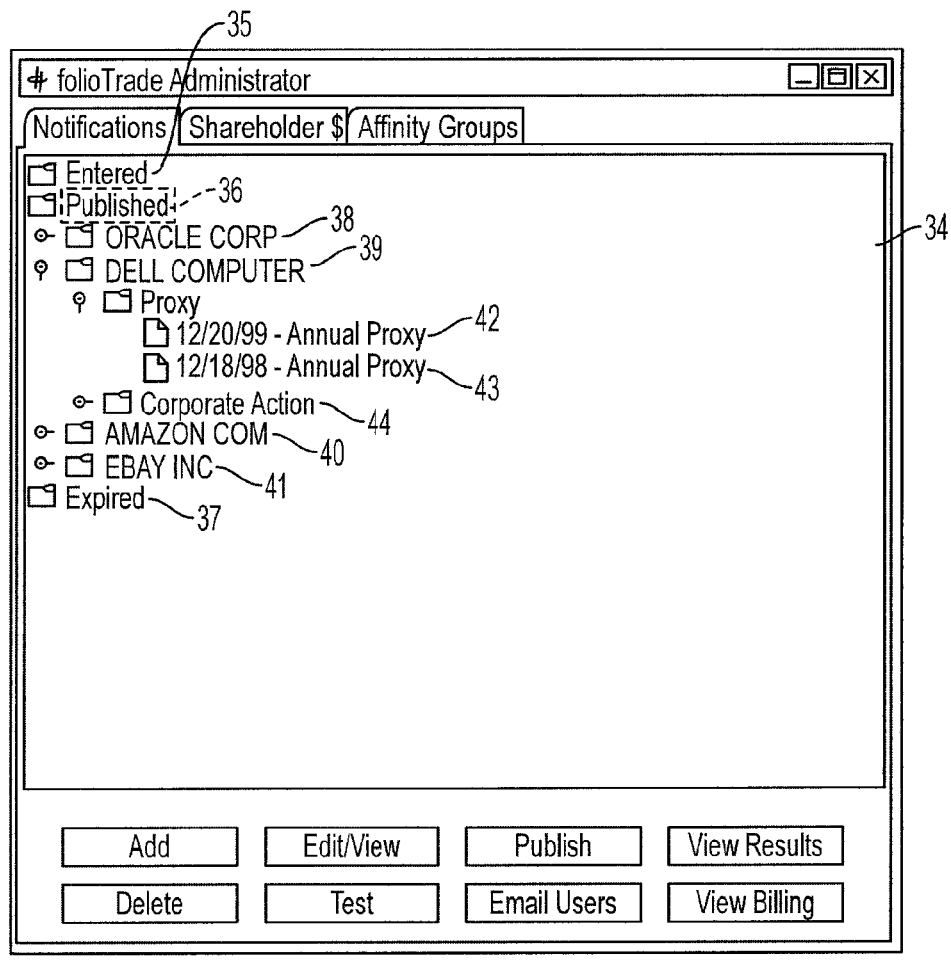

FIG. 3B depicts an exemplary screen of the notifications tab 34. The notifications screen 34 displays the list of all corporate notifications in the system. The notifications are arranged in a tree format. The top-level folders are status types: entered 35, published 36 and expired 37. Next, the folders are broken down by the company name, such as Oracle Computer 38, Dell Computer 39, Amazon.com 40 and eBay Inc 41. Each company folder will contain folders for different types of notifications available for that company (for example, Proxy 42, 43, Corporate Action 44, etc.). The can contain notification objects that are leafs in the tree.

The administrator can find the notification in the tree, and depending on what state the notification is in, the user interface lets the user perform some actions on a given notification. FIG. 3C depicts the edit notification screen 46, in which the General tab 48 has been selected.

Creating and editing a notification uses the same type of user interface. The edit screen 46 is created in a separate window from the main application. The screen 46 contains editing fields and save and cancel buttons. The editing fields are separated into three tabs: General Information 47, Questions 48 and Documents 49.

Figure 3D:
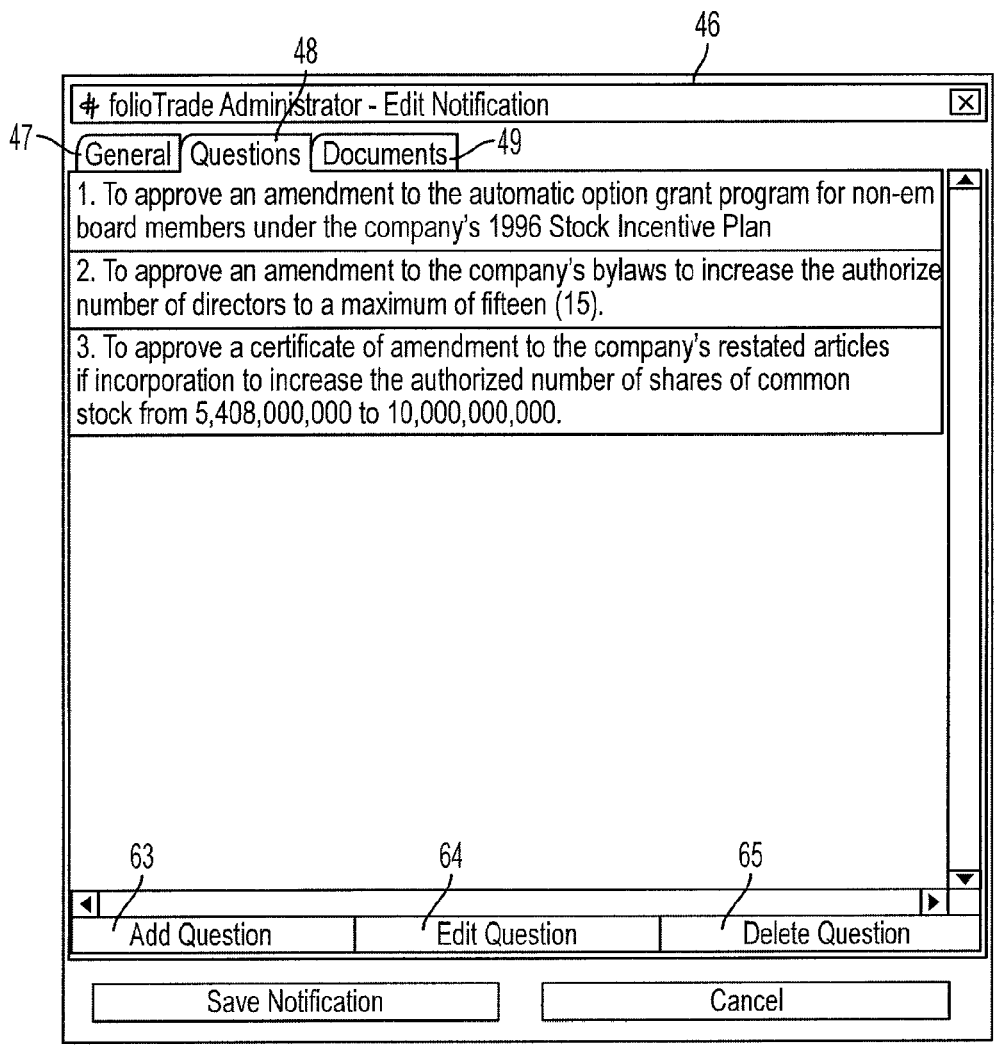
Figure 3E:
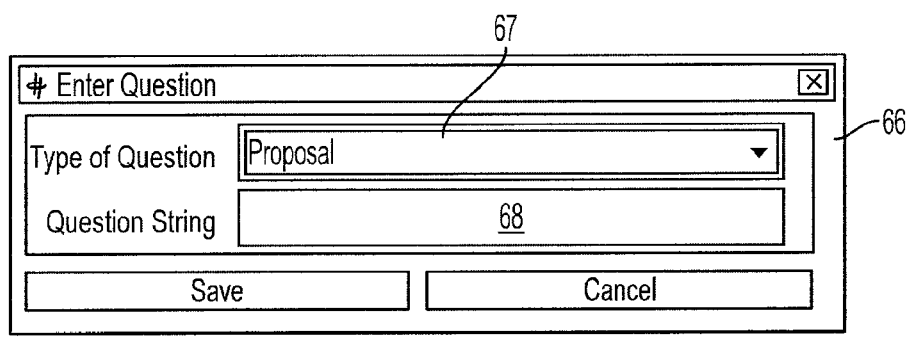

The Questions Tab, depicted in FIG. 3D, contains a list of questions already in the document. There are also buttons to add 63, edit 64 and delete questions 65, which is accomplished via a dialog box 66, for example, which is shown in FIG. 3E. The dialog box 66 permits selection of a type of question (e.g., proposal) 67 from a drop down menu and entry of a question string in field 68.

The Documents Tab, depicted in FIG. 3F, includes a list of notification related documents. Documents can be added or deleted using this interface.

Figure 3G:
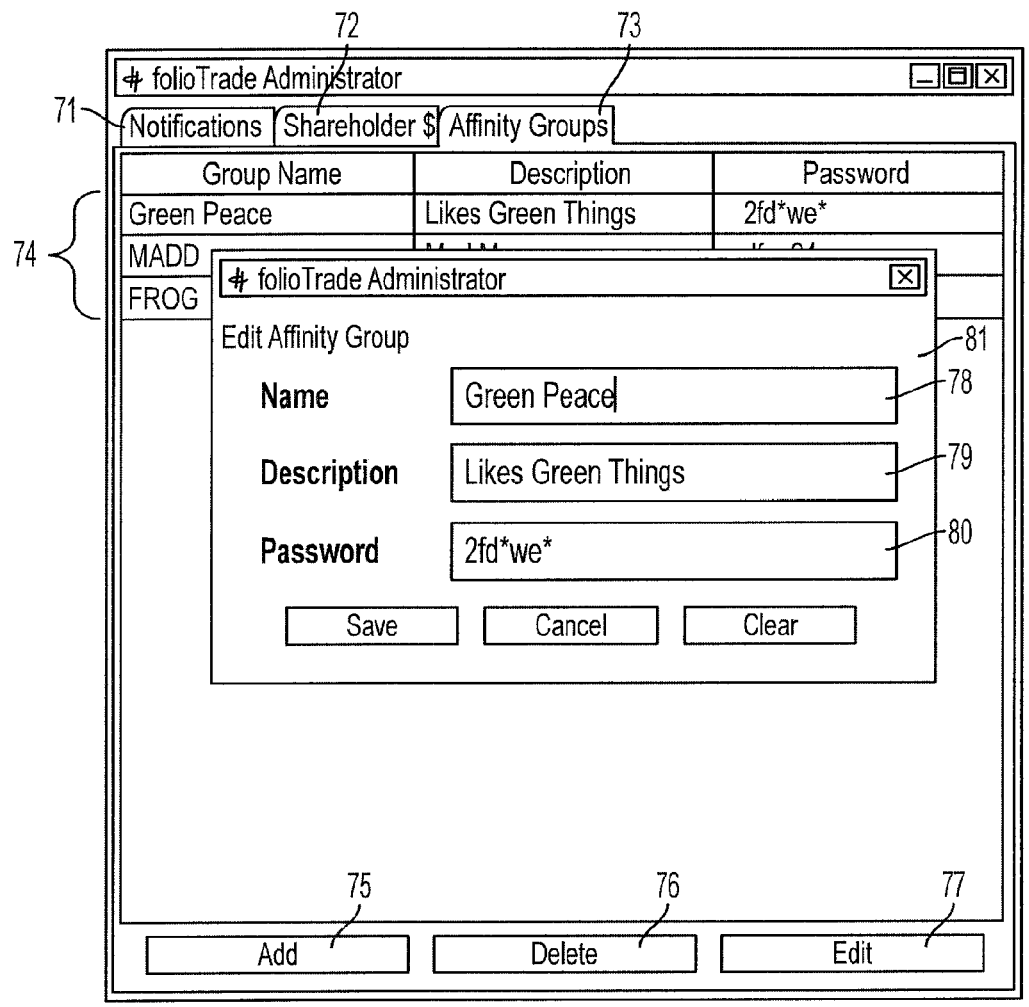

The Affinity Groups screen 73, which is a tab in the main screen having tabs for notifications 71, shareholders 72 and affinity groups 73, and which is depicted in FIG. 3G, includes a table 74 listing each affinity group in the system. There are three buttons—Add 75, delete 76 and edit 77. Clicking on each of these buttons 75-77 opens a dialog box 81, which is populated with name 78, description 79 and password 80 to authenticate the user. Each row is the table 74 listing of affinity groups also has the affinity name 78, description 79 and password 80 depicted.

Figure 3H:
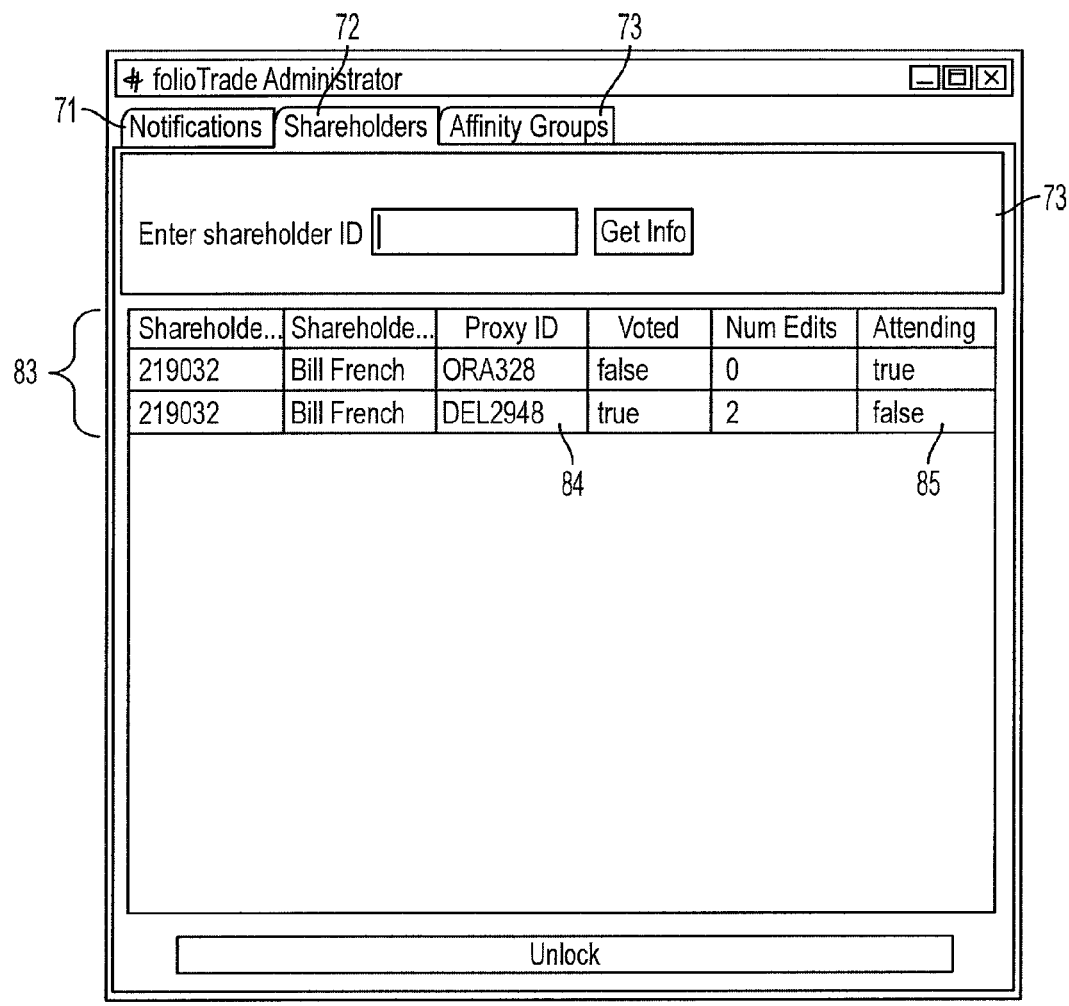
Figure 31:
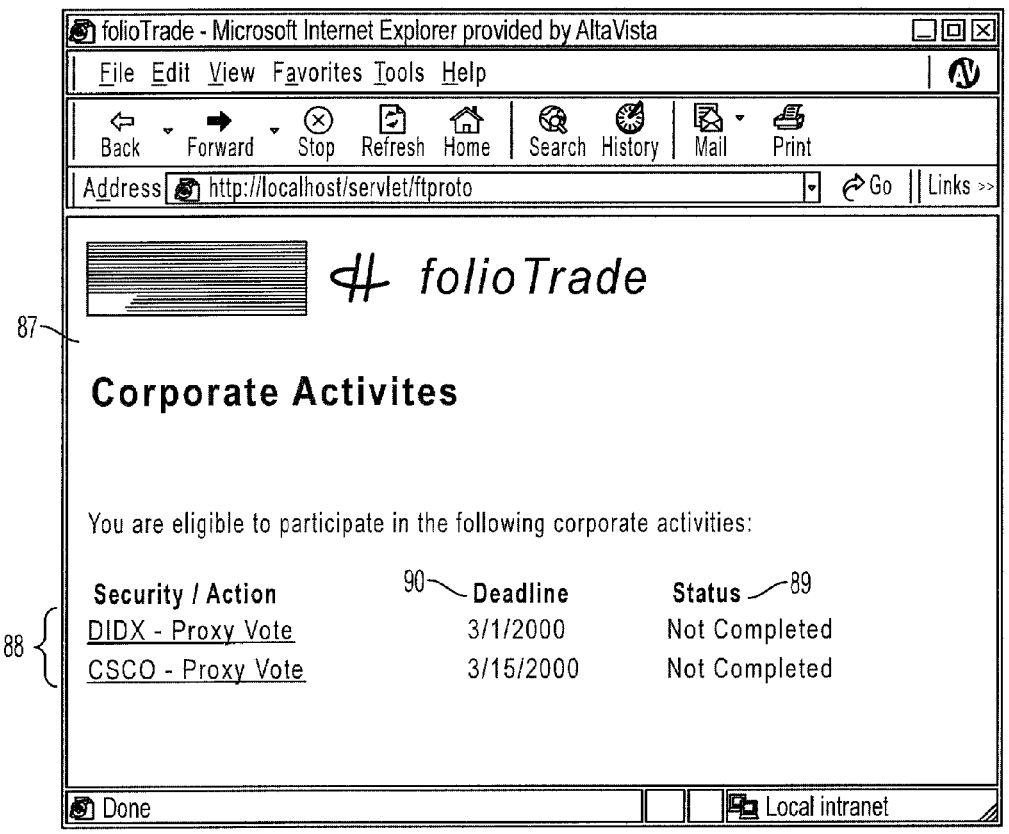

The Shareholders screen 73, depicted in FIG. 3H, lists the shareholders 83 in the system, the notifications 84 on which they have voted, and whether they are attending the shareholder meeting 85. If so, the administrator can lock their votes from being entered into the electronic voting system.

Voting System

The voting system 2 is a collection of hyper-text markup language (HTML) web pages stored on a web server that allow a user to respond to any corporate notification offering or requiring shareholder feedback. Examples of corporate notifications include proxy cards, tender offers, stock splits, etc. The shareholder feedback can be simply a yes/no response to a proposal or as complex as a proxy card with numerous questions, question types and supporting documents.

In this embodiment, the HTML pages are accessible over a secured hyper-text transfer protocol (HTTP) connection (called HTTPS). Users are authenticated using passwords for each session. The HTML pages are generated using a server-side java technology called java server pages (JSP). JSP lets a developer write java code for handling the analytic chores and wrapping that java code within an HTML presentation.

The system receives a proxy announcement or other corporate notification from multiple outside sources. An administrator enters the proxy card information into the system, either by scanning or other means. The proxy card is then sent to the appropriate users via email, for example, which also instructs the users as to the location on the web where voting takes place.

Shown in FIG. 3I is the corporate activities page 87 that contains all links to all corporate notifications 88 that a given user is eligible to vote. The links may be organized by security and notification type. Additional fields display the current status 89 (completed/not completed) and the response deadline 90.

Figure 3J:
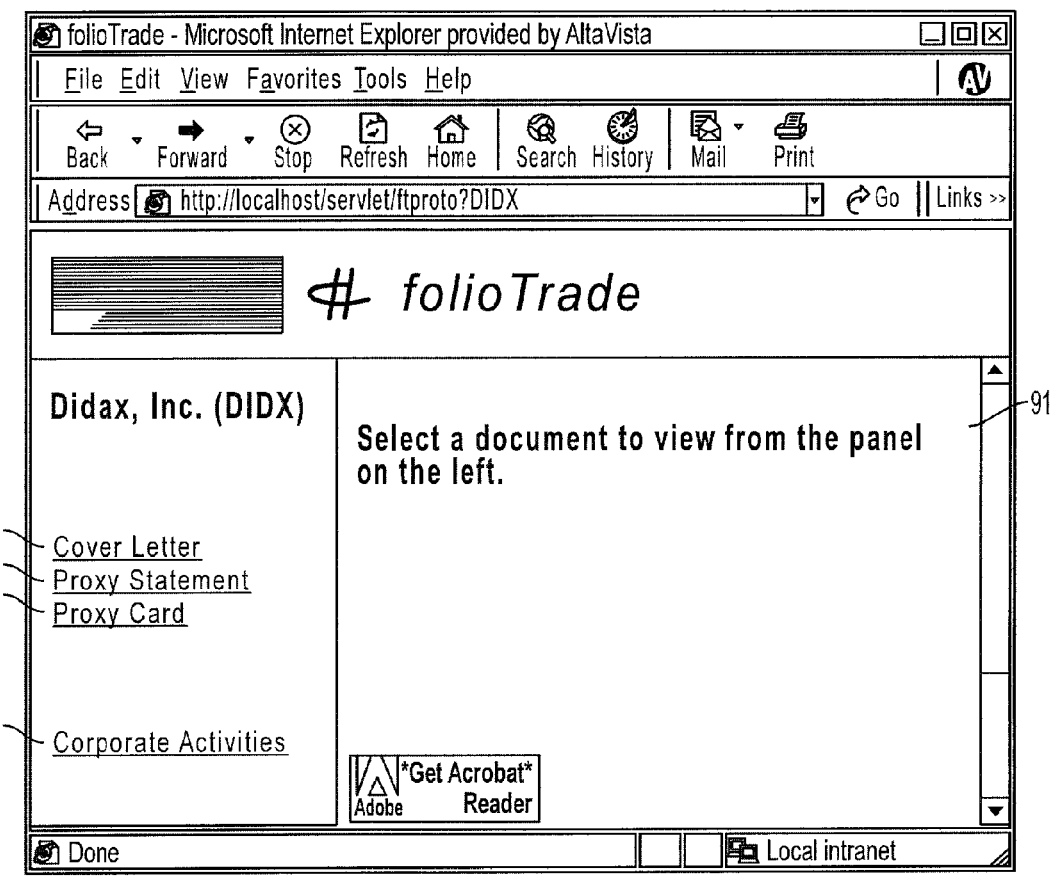
Figure 3K:
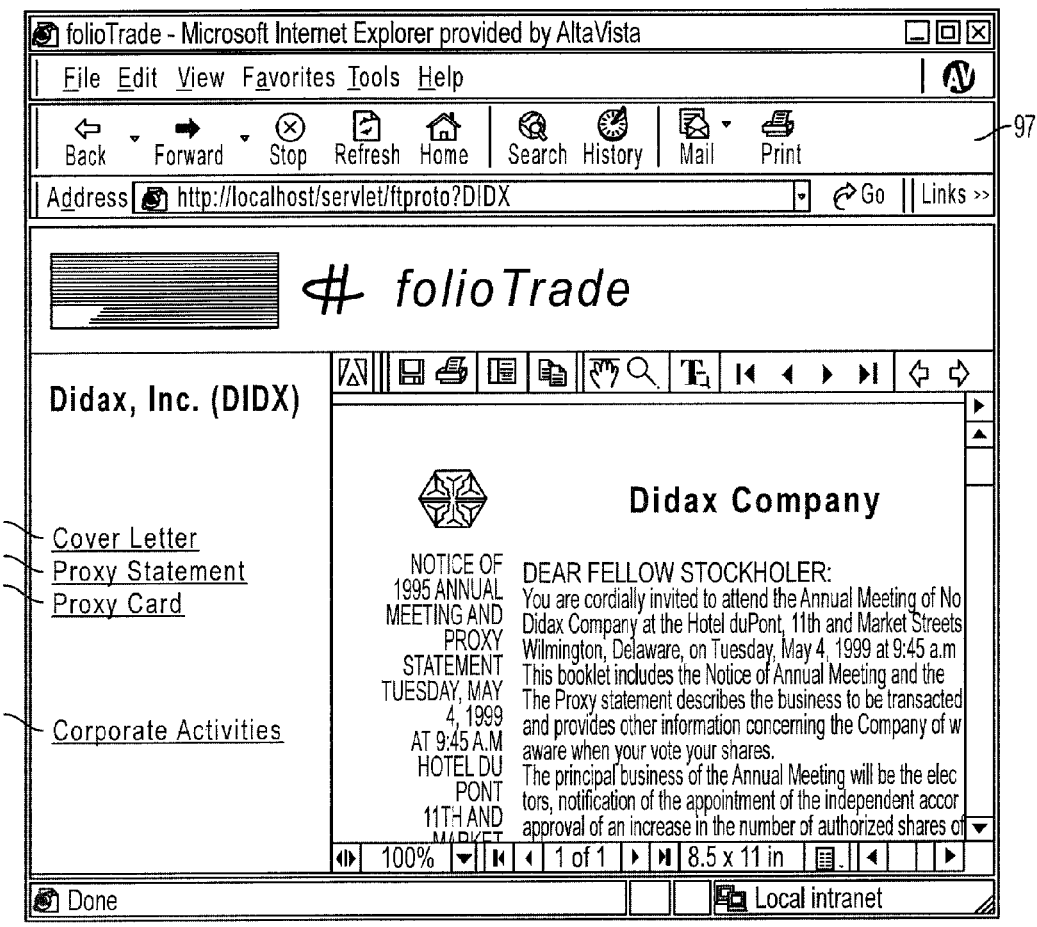

Shown in FIG. 3J is the corporate notification page 91. After selecting a particular corporate notification 92-95 on the corporate activities page, the user is presented with the corporate notification page 97, which is depicted in FIG. 3K. Shown in FIG. 3K is a letter to the stockholders of Didax Company.

Figure 3L:
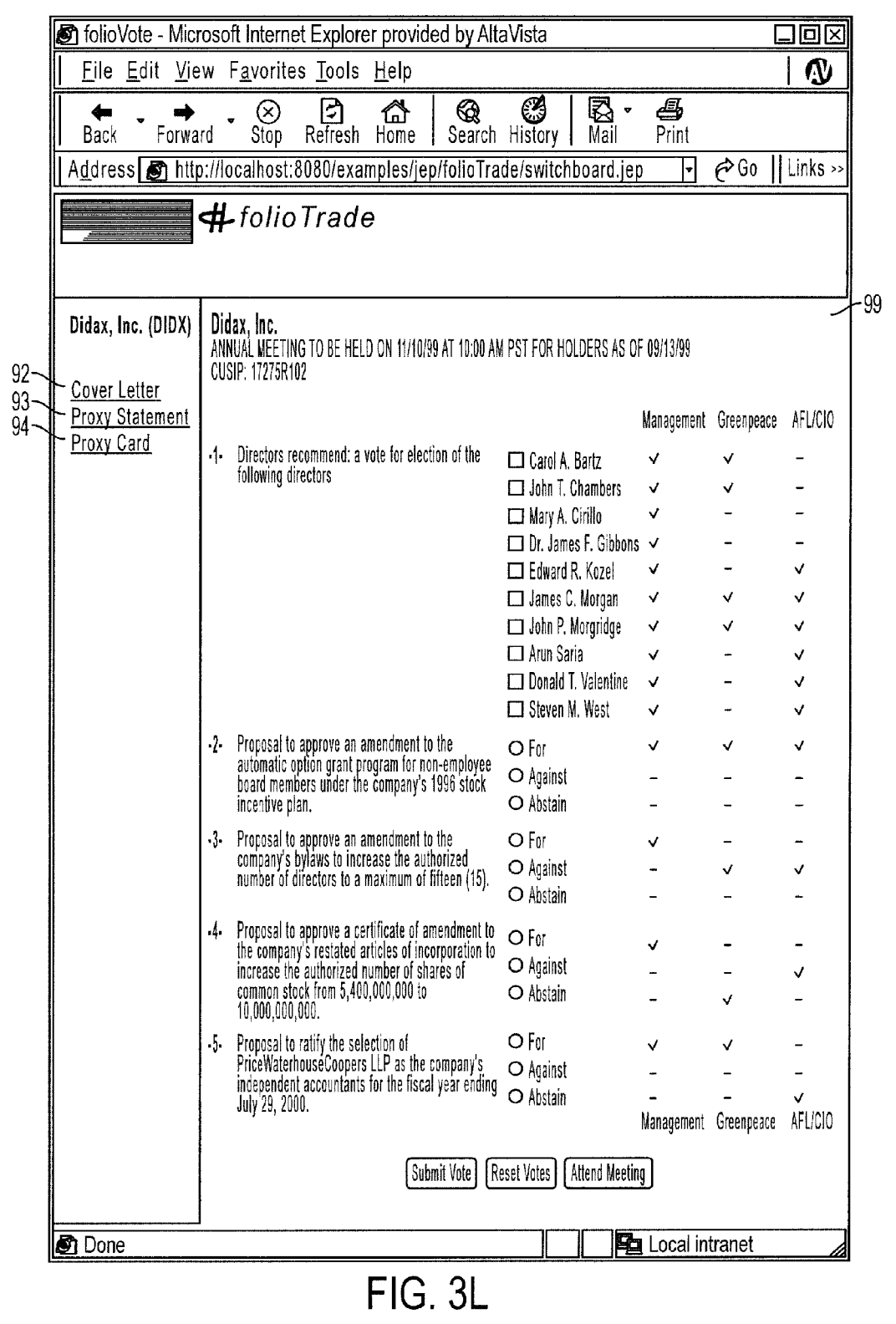

This page 97 has multiple frames. There is a frame with links to all the supporting documents and voting form 99, which is shown in FIG. 3L. Supporting documents can include proxy statements, annual reports, or any other material relevant to the issues the shareholder must vote. Another frame displays the contents of these documents as well as the voting form itself 99. Supporting documents may be stored in Adobe PDF format, which would require an Adobe Acrobat viewer, normally available for free from Adobe. After reading any supporting documents, the user will click on a link to the voting form.

The voting form 99 displays each question and provides an appropriate set of inputs (e.g., checkboxes, radio buttons, text fields, etc.) based on the question type. There is also a "vote with management" button that automatically answers each question with management's recommendations.

At this point, the user may review all questions and fill out the form. Alternatively, if the shareholder wishes to attend the meeting in person, the shareholder may press a button that will create a legal proxy form in PDF format that the shareholder may print and take to the meeting.

If the user has previously cast votes on this voting form and is returning before the cutoff date, the form will display the user's saved choices. At this point, the user may change any of these choices and resubmit the form. The user may also press the "attend the meeting" button, which will invalidate the user's previous online votes and print out the legal proxy form. Once the user prints out the legal proxy form, the user is locked out from further electronic voting to prevent voter fraud.

The voting page 99 includes one column that displays the management's recommendations. Other columns display the recommendations of specified affinity groups. If the user is interested in tracking the opinions of special interest groups, the user may indicate this interest on an affinity group preference page, which lists all the affinity groups with data in the system. Once selected by the user, these groups' recommendations will be displayed on this page.

In addition, the user can select a button to link its votes with a specified affinity group, so that in the future other votes will be done automatically in accordance with the selected affinity group's recommendations without requiring further input from the user. This capability ensures that the user can spend minimal time, if desired, on voting his or her shares.

Proxy Voting Database

The system keeps track of all proxy-related data and user votes in database tables in a database 3, such as an Oracle® database. Shareholder information is tracked by another database 6 used in processing shareholder investments from the Portfolio Management System 5.

U.S. patent application Ser. Nos. 09/038,158 and 09/139,020, which is a continuation-in-part of U.S. patent application Ser. No. 09/038,158, disclose a portfolio manager for creating and managing portfolios of securities, in which, among other things, trades are aggregated and/or netted prior to executing certain types of securities trades. Both U.S. patent application Ser. Nos. 09/038,158 and 09/139,020 are hereby incorporated by reference, as if repeated herein in its entirety, including the drawings.

In this database 3, the notification table is the main table. It contains information for each notification. A notification is identified by its system-generated ID. Each notification contains the issuer information like CUSIP number and the description of the notification. This table may contain multiple notifications issued by the same issuer.

ALTERNATE EMBODIMENT

Figure 2:
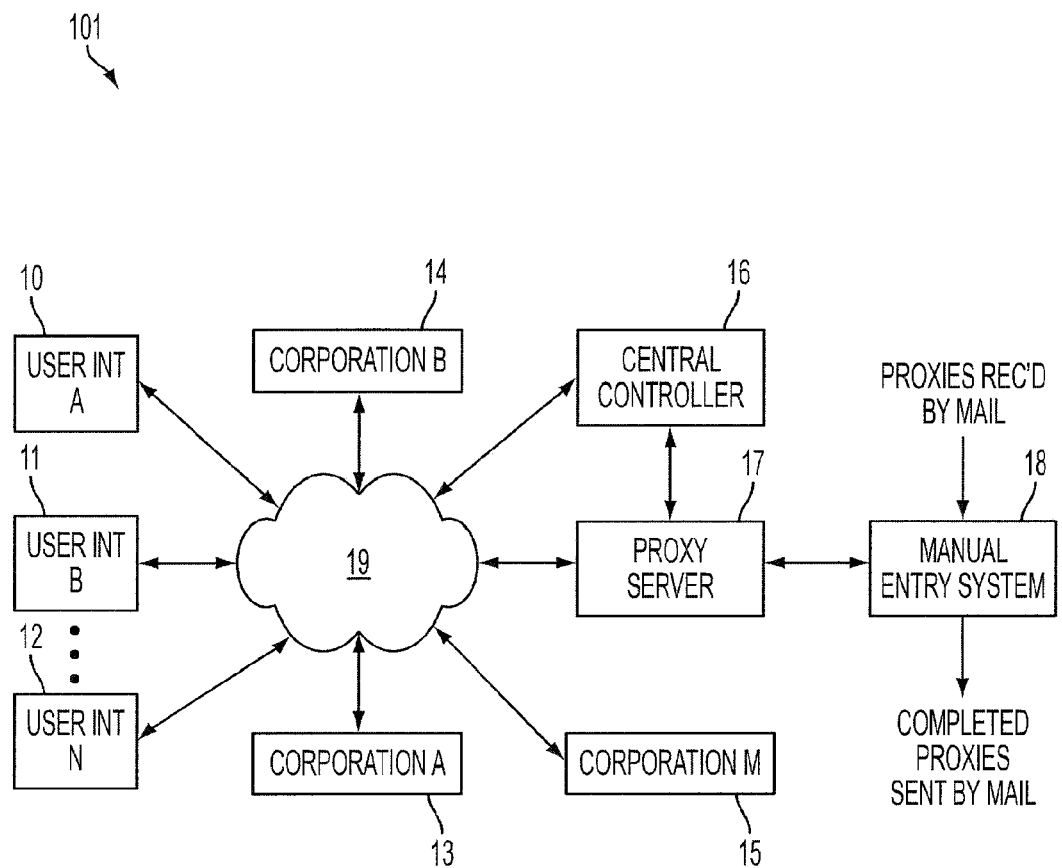
FIG. 2 depicts another exemplary embodiment of a system according to the present invention.

Referring to FIG. 2, the present invention provides a computer-based system 101 for enabling investors (shown as user interfaces A-N 10, 11, 12) to vote shares automatically without necessarily their intervention so that investors with large and diverse investment portfolios can manage their proxies efficiently. Thus, a user can enter once the user's preferences regarding present and future corporate votes, e.g., always follow management, always oppose management, always follow a particular industry expert's recommendations, etc., and the system will screen all future corporate actions and enter the users' preferences on the proxy card and return the completed proxy card at the proper time.

The system 101 of the present invention includes a user interface 10-12 via which the investor enters his preferences as to how to vote his proxies. These preferences can include the above-discussed preferences.

Proxies are received by a proxy server 17 either by electronic communication with the various corporations A, B, . . . , M (13-15) or by mail. For those corporations who communicate the proxies electronically, the proxy server serves as the interface to these corporations.

For those corporations that send proxies by mail, a manual entry system 18 is provided, in which received proxies are converted into electronic format for subsequent processing by the system 101. In addition, the manual entry system 18 serves as an output to those corporations that must receive the completed proxies by mail or otherwise in hard copy.

Once the preferences are entered into the user interface, the computer-based system 101 receives all of the proxy cards, screens the received proxies or corporate action notifications and statements and enters the investor's votes in accordance with the stated preferences. The completed proxy cards are then returned to the company via electronic route, if available, or by regular mail for vote tallying.

User Interface

The user interface includes a personal computer and software via which the system presents several methods of voting the user's preferences. One possible user interface comprises a graphical user interface, such as a dedicated web site.

Via the user interface, the system presents several groups who will recommend voting based on the group's stated goals. One possibility is that a group, such as Greenpeace, will present recommendations on voting for each corporation involved. Many possible types of groups, individuals or organizations can be potentially represented, including competing corporations in which the user has interests.

The user can then indicate to the system that the user wishes to follow (or even oppose) the recommendations of one of the stated groups. Alternatively, the investor can select to vote with management or against management. Alternatively, the investor can select to vote based on some market expert for the particular trade sector. In this possible embodiment, each market sector has an expert who reviews the proxy statements and makes recommendations based on his review as to how to vote. The users then can select to follow this recommendation or not.

The user interface may include several layers of alternative voting, in case one of the layers does not have a recommendation for the particular vote. In addition, the user interface provides for selecting multiple organizations for voting recommendations, and basing the ultimate vote on a position held by a majority of the selected organizations.

In addition, the user interface provides a filtering capability of proxies. Using this capability, the user can filter out proxies concerning strategic corporate decisions from the more pro forma proxy votes. This allows the users to focus on the most significant votes and ignore the remaining votes. Under this capability, the system will assign a ranking to each proxy vote relative to some predetermined criteria. For example, a vote concerning a merger or acquisition may have a high ranking, whereas a vote concerning appointment of an accounting firm. This enables the user to focus energy and time on the most significant votes.

Proxy Server

The proxy server consists of a standard server that can communicate with other computers. Proxies can be received in the form of electronic mail (e-mail), files sent by file transfer protocols (ftp), for example, or any other standard electronic communication format. The proxy server 17 interacts with the various corporations either over the Internet 19 or any other communication network.

By transmitting a single tally of the shareholders' votes in a single electronic message, the present invention provides incentives to the corporations to create an interface to the proxy server. The message can be sent in traditional email format, or other suitable format, depending upon the needs of the particular corporation.

Central Controller

The central controller 16 controls all aspects of the proxy system 101. As proxies are received from the various corporations, the central controller accumulates the proxies and records the due dates and returns the completed proxies by the designated due date. For those users that have not entered data into the proxy preference database, the central controller transmits messages to these users and alerts them to this deficiency. If data is not received in time for the proxies to be returned to the corporations, the central controller sends another message indicating that the proxy was returned incomplete (or was not returned).

Manual Entry Subsystem

The manual entry subsystem 18 serves as the entry point for those proxies that arrive via hardcopy. When the investor purchases a particular security, the investor designates a mailing address for the proxies, which is a Post Office Box operated by the system 1. For those corporations that transmit proxies by electronic mail, the investor enters the system e-mail address (e.g., proxies@foliotrade.com). The manual entry subsystem 18 then converts the hardcopy proxies into an electronic format for further processing by the system 1. The original proxy is retained at the manual entry subsystem 18 for later completion and return to the corporation. Once in electronic form, the proxies are sent to the central controller 16 via the proxy server 17 just like all other received proxies.

When the proxies are completed by the central controller 16, the completed proxies are returned to the corporation by the designated route, either electronically by return email, for example, or by mail via the manual entry subsystem 18. If the proxy must be returned by mail, the completed proxy is returned in electronic format to the manual entry subsystem 18, which then prints the completed information onto the original proxy. The original proxy is then returned to the corporation that sent it.

In sum, the present invention significantly simplifies the management of diverse portfolios of investments by enabling investors to delegate the responsibility of investigating and comprehending corporate actions to parties whose interests are such they will fully investigate the corporate actions. Once delegated via computer, the investor can have his or her shares voted continually in accordance with the stated preferences.

It should be noted that the above method for voting shares in a corporation, is applicable to many types of investments requiring user feedback and is not limited to the embodiments discussed herein. For example, the present invention is applicable to any election in which the user desires to vote in accordance with a third party's recommendations, including political elections, in which for example a user desires to vote in accordance with a specifiable political party.

What is claimed is:

1. A method for automatically voting shares for at least two different corporations comprising:

receiving by a computer preferences regarding how to vote a user's shares in all subsequent corporate votes for all of a user's holdings in the user's portfolio, wherein said user's portfolio includes shares issued by at least two different corporations;

wherein said preferences include an identification of one or more organizations whose voting recommendations are to be followed when voting the user's shares in all future corporate votes for said at least two different corporations and, when more than one organization is to be followed, a user-specified weight assigned to each of said organizations;

automatically completing by a computer a first proxy card to vote a user's shares in a first corporation of the at least two different corporations in accordance with the received preferences in a first corporate vote for the first corporation;

automatically completing by a computer a second proxy card to vote a user's shares in a second corporation of the at least two different corporations in accordance with the received preferences in a first corporate vote for the second corporation;

automatically returning by a computer a first completed proxy card to a first election authority for the first corporate vote for the first corporation; and automatically returning by a computer a second completed proxy card to a second election authority for a first corporate vote for the second corporation;

wherein said first completed proxy card and said second completed proxy card are used to vote the user's shares in accordance with the received preferences.

2. The method according to claim 1, further comprising:

automatically completing by a computer a third proxy card to vote a user's shares in the first corporation in accordance with the received preferences in a second corporate vote for the first corporation; and automatically returning by a computer a third completed proxy card to the first election authority for the second corporate vote for the first corporation.

3. The method according to claim 2, further comprising:

automatically completing by a computer a fourth proxy card to vote a user's shares in the second corporation in accordance with the received preferences in a second corporate vote for the second corporation; and automatically returning by a computer a fourth completed proxy card to the second election authority for the second corporate vote for the second corporation.

* * * * *

UNITED STATES PATENT AND TRADEMARK OFFICE
CERTIFICATE OF CORRECTION

PATENT NO.        : 7,640,182 B2                                                        Page 1 of 1
APPLICATION NO. : 11/218589
DATED             : December 29, 2009
INVENTOR(S)       : Steven M. H. Wallman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 25 days.

Signed and Sealed this

Ninth Day of November, 2010

David J. Kappos
*Director of the United States Patent and Trademark Office*